US00RE36195E

United States Patent [19]

Coleman

[11] E Patent Number: Re. 36,195

[45] Reissued Date of Patent: Apr. 27, 1999

[54] MINI-BLIND SLIDE-ON ATTACHMENT

[76] Inventor: Edward A. Coleman, 55 Ballantyne Rd., Rochester, N.Y. 14623

[21] Appl. No.: 08/697,110

[22] Filed: Aug. 26, 1996

Related U.S. Patent Documents

Reissue of:

[64] Patent No.: 5,520,235
Issued: May 28, 1996
Appl. No.: 08/333,032
Filed: Nov. 1, 1994

[51] Int. Cl.[6] ..... A47H 1/00

[52] U.S. Cl. ..... 160/89; 160/178.1 R; 160/126; 248/261

[58] Field of Search ..... 160/178.1 R, 113, 160/126, 89, 902, DIG. 12, 330; 2448/252, 253, 255, 261, 263

[56] References Cited

U.S. PATENT DOCUMENTS 4,840,216 6/1989 John ..... 160/178.1
5,520,235 5/1996 Coleman ..... 160/89

FOREIGN PATENT DOCUMENTS 72878 12/1947 Norway .

*Primary Examiner*—Blair Johnson
*Attorney, Agent, or Firm*—K. Lukacher; M. Lukacher

[57] ABSTRACT

A new and improved mini-blind slide-on attachment with a tail section having an open lower portion. The open lower portion receives a head box of the mini-blind therein. An inner support section is integral with a front wall of the tail section. The inner section serves to receive end caps of curtain rods therein for hanging a curtain therefrom. A hanger section is integral with a bottom portion of the inner support. The bottom portion has a receiving slot formed therethrough. The receiving slot serves to receive drape hangers therein. Two parallel raised ridges are integral with an outer surface of the hanger section. The two parallel raised ridges serve to receive snap-in hooks that hold curtains with rods in pockets.

6 Claims, 9 Drawing Sheets

MINI-BLIND SLIDE-ON ATTACHMENT

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a mini-blind slide-on attachment and more particularly pertains to upgrading existing mini-blinds already installed in a home to allow drapes and curtains to cover a window with a mini-blind slide-on attachment.

2. Description of the Prior Art

The use of mini-blind installation assemblies is known in the prior art. More specifically, mini-blind installation assemblies heretofore devised and utilized for the purpose of supporting mini-blinds are known to consist basically of familiar, expected and obvious structural configurations, notwithstanding the myriad of designs encompassed by the crowded prior art which have been developed for the fulfillment of countless objectives and requirements.

By way of example, U.S. Pat. No. Des. 337,469 to Young et al. discloses the ornamental design for a window blind headrail.

U.S. Pat. No. 5,188,162 to Simon et al. discloses a mini blind system and valence assembly therefor.

U.S. Pat. No. Des. 325,681 to Gartenmaier discloses the ornamental design for a headrail for a venetian blind.

U.S. Pat. No. 4,601,319 to Georgopoulos discloses an installation hardware for venetian blind in a van window frame.

U.S. Pat. No. 4,251,960 to Large discloses blind curtain rod hardware.

U.S. Pat. No. 4,567,930 to Fischer discloses a consumer-adjustable mini-blind.

While these devices fulfill their respective, particular objective and requirements, the aforementioned patents do not describe a mini-blind slide-on attachment for upgrading existing mini-blinds already installed in a home to allow drapes and curtains to cover a window.

In this respect, the mini-blind slide-on attachment according to the present invention substantially departs from the conventional concepts and designs of the prior art, and in doing so provides an apparatus primarily developed for the purpose of upgrading existing mini-blinds already installed in a home to allow drapes and curtains to cover a window.

Therefore, it can be appreciated that there exists a continuing need for new and improved mini-blind slide-on attachment which can be used for upgrading existing mini-blinds already installed in a home to allow drapes and curtains to cover a window. In this regard, the present invention substantially fulfills this need.

SUMMARY OF THE INVENTION

In the view of the foregoing disadvantages inherent in the known types of mini-blind installation assemblies now present in the prior art, the present invention provides an improved mini-blind slide-on attachment. As such, the general purpose of the present invention, which will be described subsequently in greater detail, is to provide a new and improved mini-blind slide-on attachment and method which has all the advantages of the prior art and none of the disadvantages.

To attain this, the present invention essentially comprises a mini-blind having a head box. The device contains a tail section having an inner surface, an outer surface, a front wall, a back wall, and an open lower portion. An adhesive strip is coupled with the inner surface of the back wall. The open lower portion receives the head box of the mini-blind therein. The adhesive strip couples with a side portion of the head box. The device contains an inner support section having a top portion, a bottom portion, and a side portion. The side portion is integral with the outer surface of the front wall of the tail section. The inner section serves to receive end caps of curtain rods therein for hanging a curtain therefrom. The device contains a hanger section having a top portion, a front portion, and a bottom portion. The top portion is integral with the bottom portion of the inner support. The bottom portion has a receiving slot formed therethrough. The receiving slot serves to receive drape hangers therein. Two parallel raised ridges are integral with an outer surface of the front portion of the hanger section. The two parallel raised ridges serve to receive snap-in hooks that hold curtains with rods in pockets.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved mini-blind slide-on attachment which has all the advantages of the prior art mini-blind installation assemblies and none of the disadvantages.

It is another object of the present invention to provide a new and improved mini-blind slide-on attachment which may be easily and efficiently manufactured and marketed.

It is a further object of the present invention to provide a new and improved mini-blind slide-on attachment which is of durable and reliable construction.

An even further object of the present invention is to provide a new and improved mini-blind slide-on attachment which is susceptible of a low cost of manufacture with regard to both materials and labor, and which accordingly is then susceptible of low prices of sale to the consuming public, thereby making such a mini-blind slide-on attachment economically available to the buying public.

Still yet another object of the present invention is to provide a new and improved mini-blind slide-on attachment which provides in the apparatuses and methods of the prior art some of the advantages thereof, while simultaneously overcoming some of the disadvantages normally associated therewith.

Even still another object of the present invention is to provide a new and improved mini-blind slide-on attachment for upgrading existing mini-blinds already installed in a home to allow drapes and curtains to cover a window.

Lastly, it is an object of the present invention to provide a new and improved mini-blind slide-on attachment with a tail section having an open lower portion. The open lower portion receives a head box of the mini-blind therein. An inner support section is integral with a front wall of the tail section. The inner section serves to receive end caps of curtain rods therein for hanging a curtain therefrom. A hanger section is integral with a bottom portion of the inner support. The bottom portion has a receiving slot formed therethrough. The receiving slot serves to receive drape hangers therein. Two parallel raised ridges are integral with an outer surface of the hanger section. The two parallel raised ridges serve to receive snap-in hooks that hold curtains with rods in pockets.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
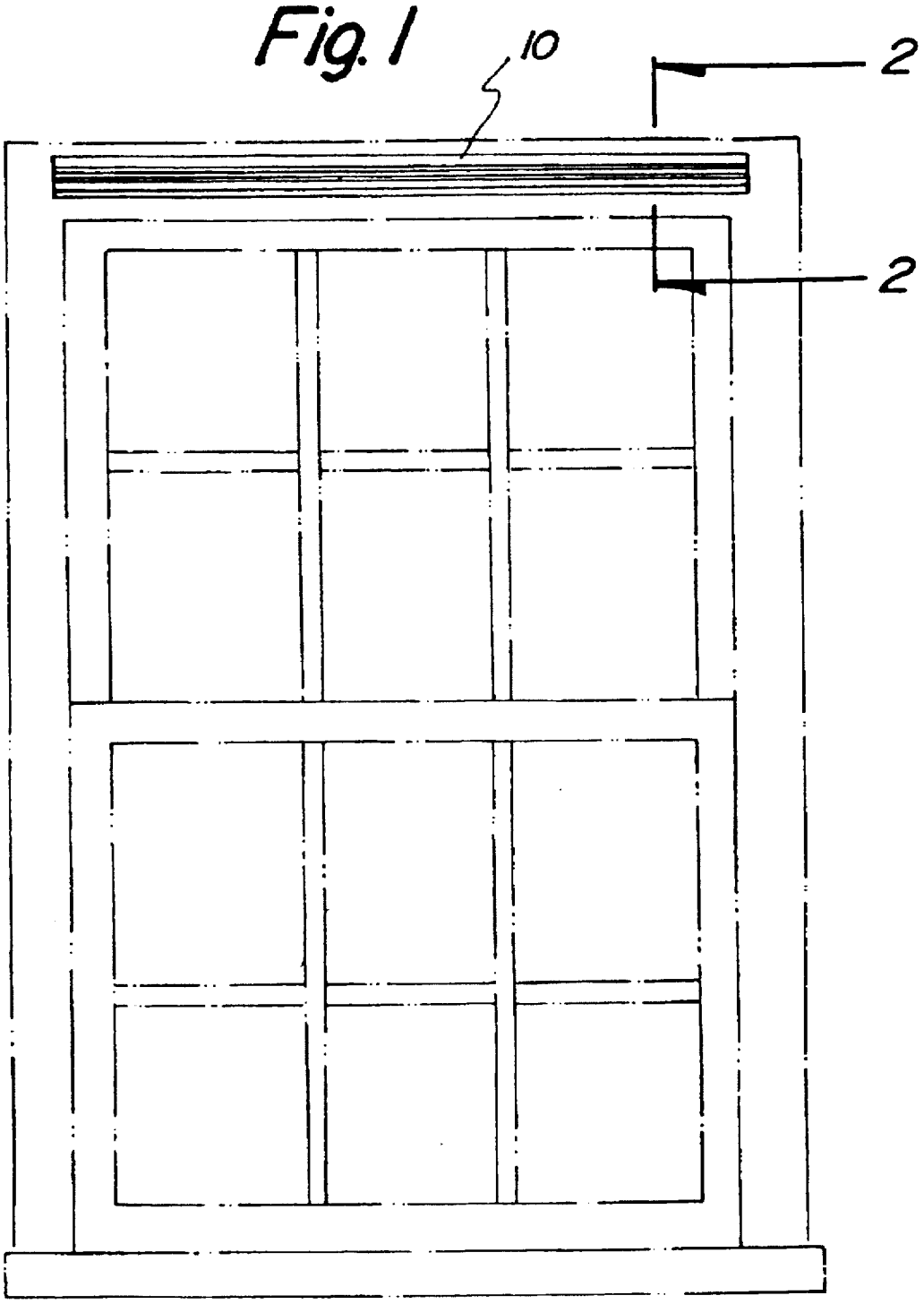
FIG. 1 is a perspective view of the preferred embodiment of the mini-blind slide-on attachment constructed in accordance with the principles of the present invention.
Figure 2:
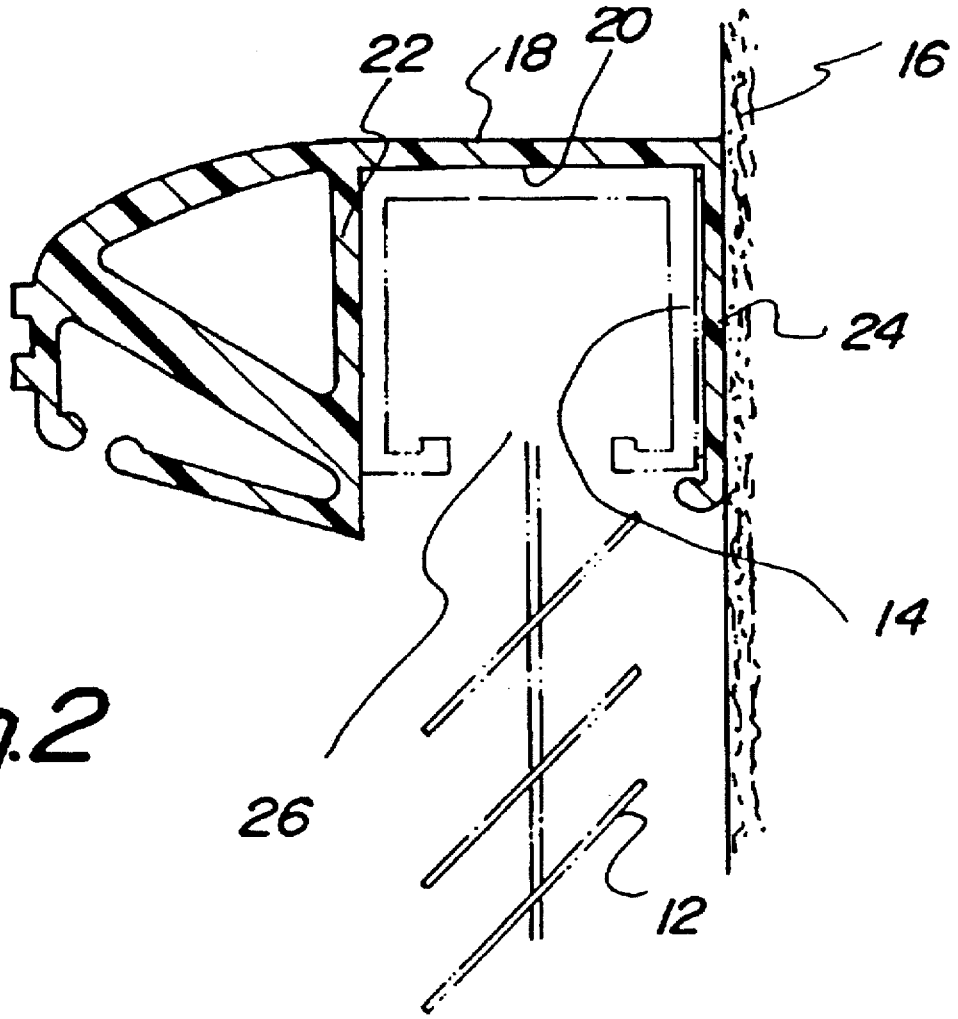
FIG. 2 is a side view of the preferred embodiment of the present invention.
Figure 3:
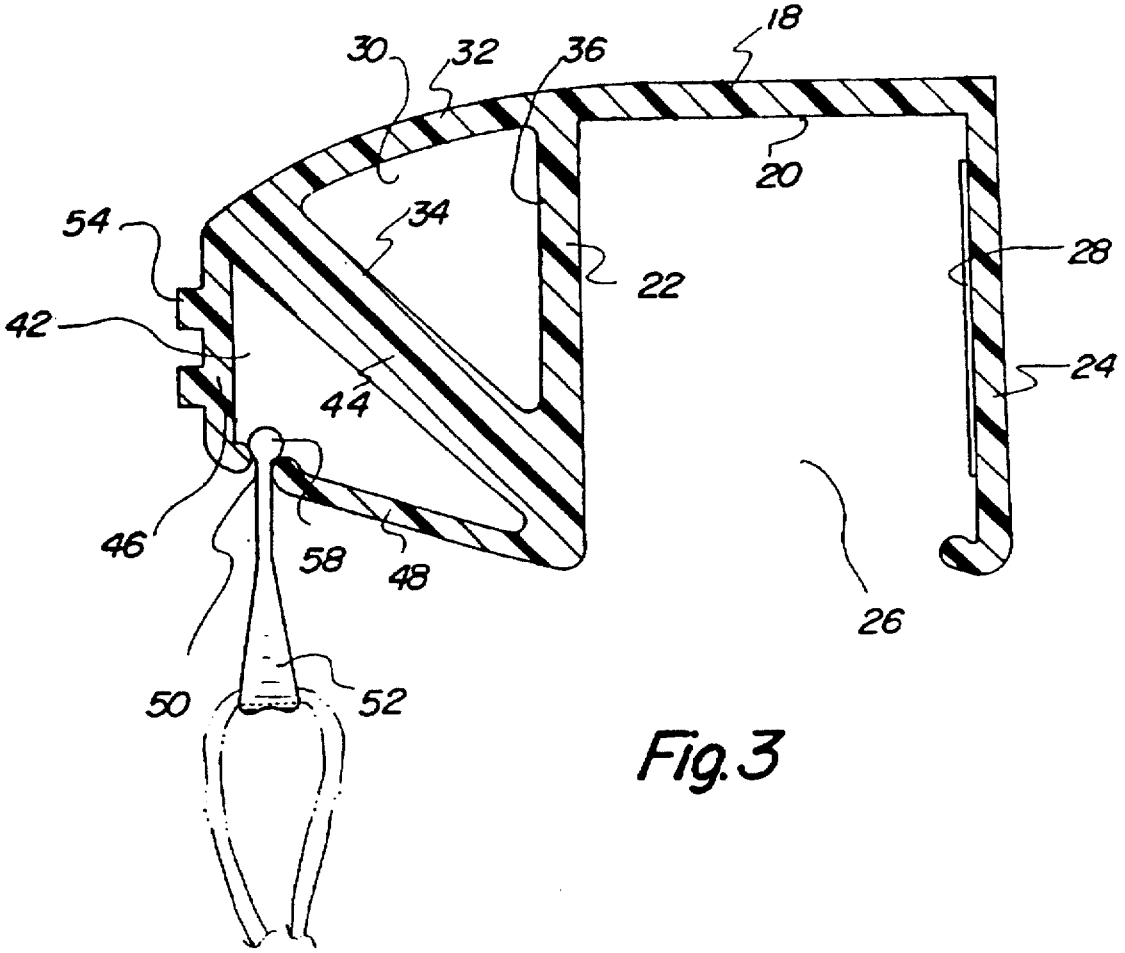
FIG. 3 is a side view of the preferred embodiment of the present invention.

With reference now to the drawings, and in particular, to FIG. 1 thereof, the preferred embodiment of the new and improved mini-blind slide-on attachment embodying the principles and concepts of the present invention and generally designated by the reference number 10 will be described.

Specifically, it will be noted in the various Figures that the device relates to a new and improved mini-blind slide-on attachment for upgrading existing mini-blinds already installed in a home to allow drapes and curtains to cover a window. In its broadest context, the device consists of a mini-blind, a tail section, an inner support section, a hanger section, and two parallel raised ridges.

The device 10 contains a mini-blind 12 having a head box 14. The mini-blind 12 can be any size to accommodate the differing sizes in windows throughout a house.

The device 10 contains a tail section 16 having an inner surface [18] *20*, an outer surface [20] *18*, a front wall 22, a back wall 24, and an open lower portion 26. An adhesive strip 28 is coupled with the inner surface [18] *20* of the back wall 24. The open lower portion 26 receives the head box 14 of the mini-blind 12 therein. The adhesive strip 28 couples with a side portion of the head box 14. Although the tail section 16 can be safely secured to the head box 14, the adhesive strip 28 provides extra support for the mini-blind 12 and prevents the tail section 16 from sliding along the head box 14.

The device 10 contains an inner support section 30 having a top portion 32, a bottom portion 34, and a side portion 36. The side portion 36 is integral with the outer surface 20 of the front wall 22 of the tail section 16. The inner section 30 serves to receive end caps 38 of curtain rods 40 therein for hanging a curtain therefrom. The inner support section 30 angles downwardly about thirty degrees from the front wall 22 of the tail section 16. The inner support section 30 has a triangular configuration.

The device 10 contains a hanger section 42 having a top portion 44, a front portion 46, and a bottom portion 48. The top portion 44 is integral with the bottom portion 34 of the inner support 30. The bottom portion 48 has a receiving slot 50 formed therethrough. The receiving slot 50 serves to receive drape hangers 52 therein. *Hanger section 42 and inner support section 30 define the front portion of device 10.*

Two parallel raised ridges 54 are integral with an outer surface of the front portion 46 of the hanger section 42. The two parallel raised ridges 54 serve to receive snap-in hooks 56 that hold curtains with rods in pockets.

Figure 4:
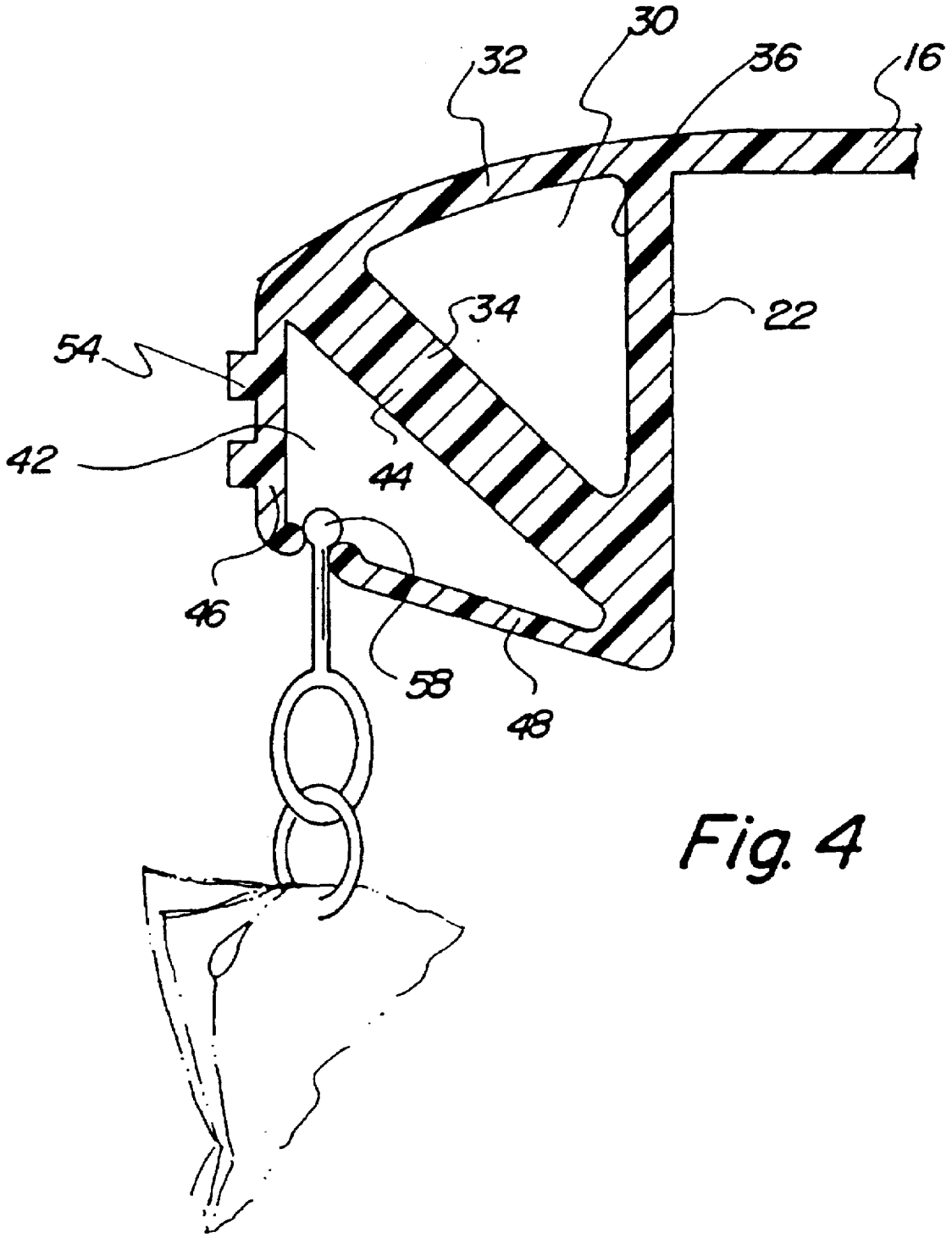
FIG. 4 is a side view of a second embodiment of the present invention.

A second embodiment of the present invention is shown in FIG. 4 and includes substantially all of the components of the present invention further including the receiving slot 50 which allows drape hangers 52 to be supported from the device 10. Any type of hanger 52 can be used, but each hanger 52 must have a securement ball 58 on its end portion to prevent the hangers 52 from exiting the receiving slot 50 when the weight of the curtain pressures the hangers 52.

Figure 5:
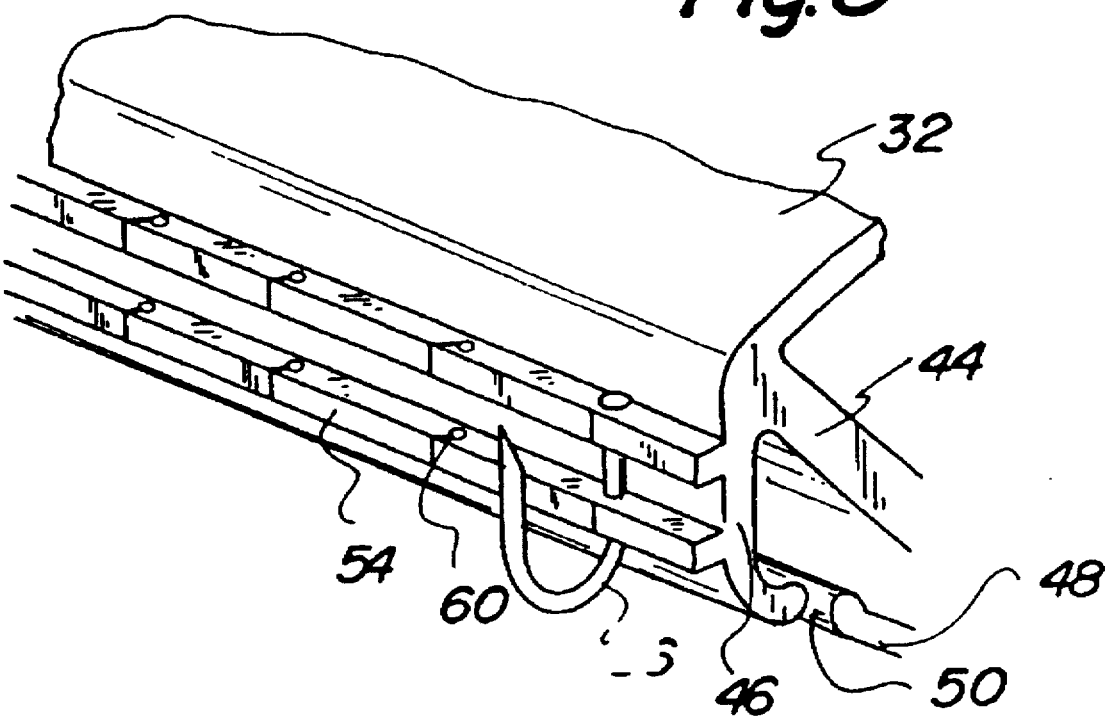
FIG. 5 is a partial perspective view of the third embodiment of the present invention.
Figure 6:
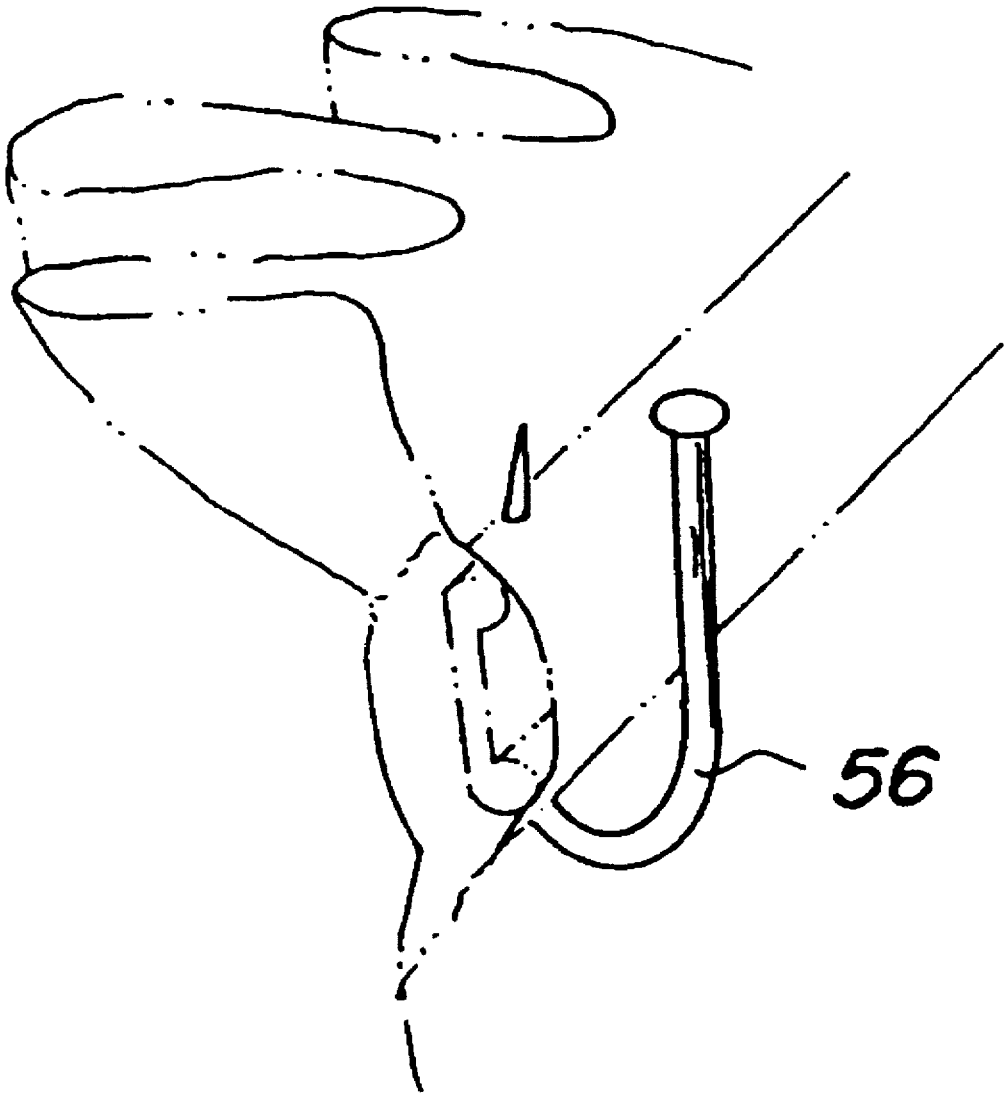
FIG. 6 is partial side view of the third embodiment of the present invention.
Figure 7:
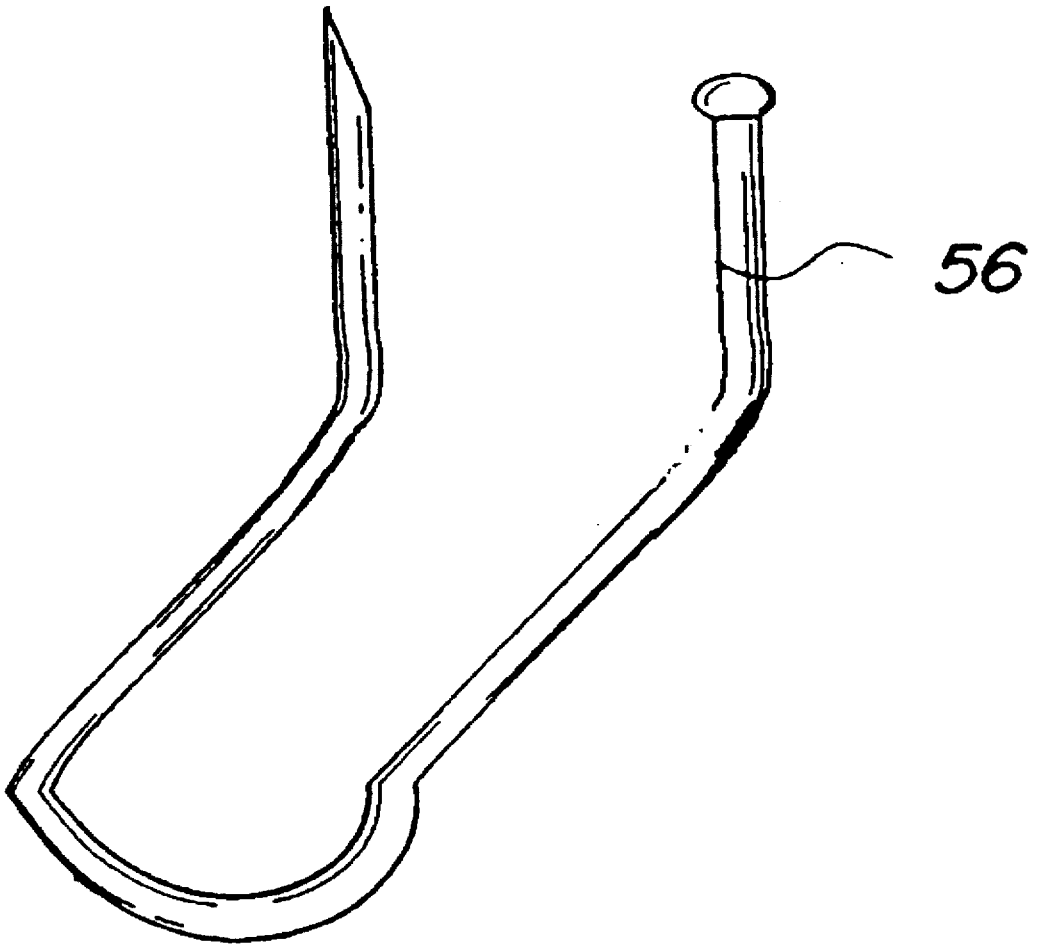
FIG. 7 is a side view of the hook of the third embodiment.

A third embodiment of the present invention is shown in FIGS. 5 and 6 and includes substantially all of the components of the present invention and further including the two parallel ridges 54. The two parallel ridges 54 have a plurality of apertures 60 formed therein. The apertures 60 serve to receive snap-in hooks 56 therein. The hooks 56 couple with a the lop of a curtain surrounding its curtain rod. This provides an easy method for hanging curtains without having to drill holes into a wall to support the curtain rod.

Figure 8:
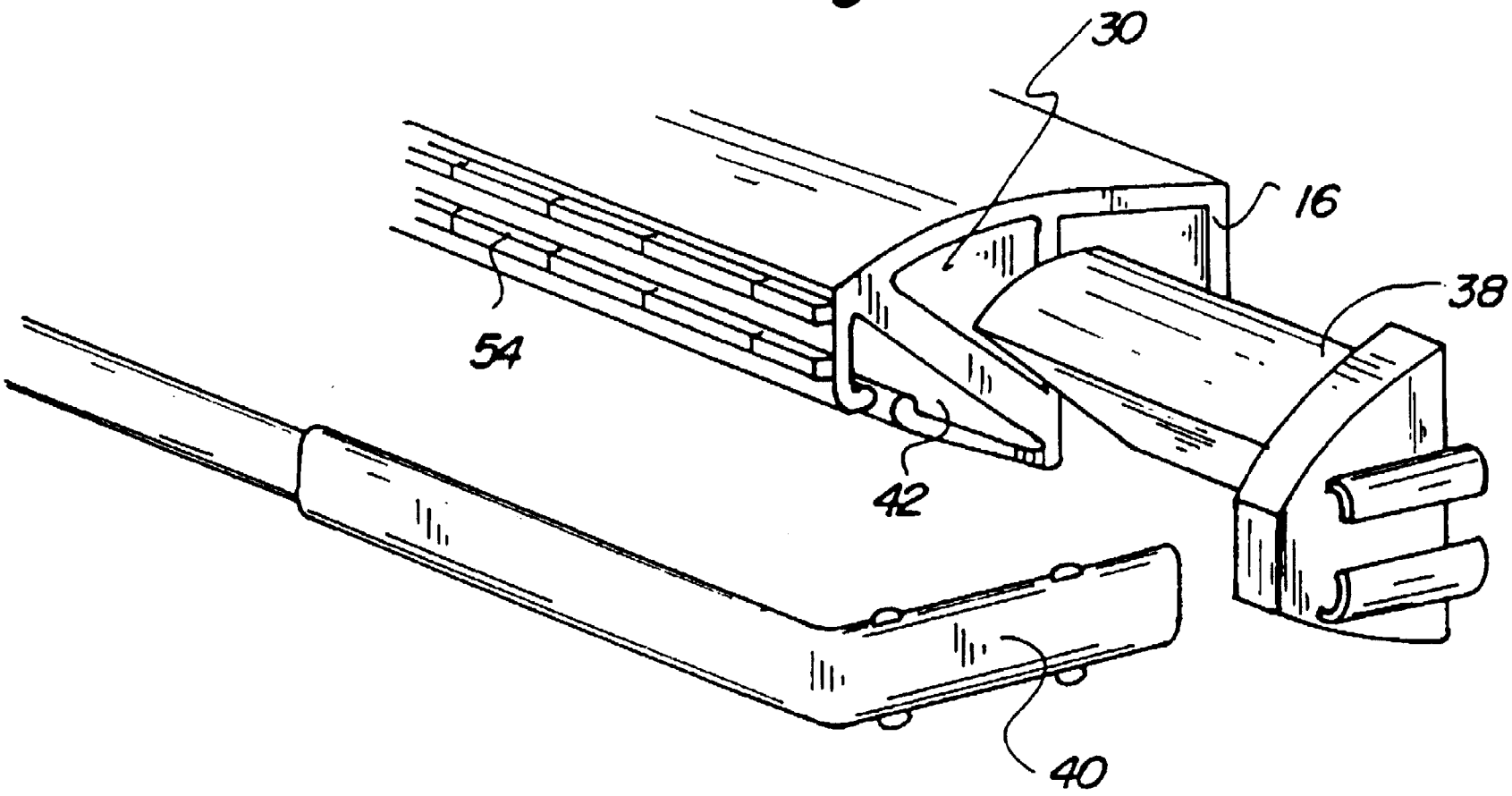
FIG. 8 is a partial perspective view of the fourth embodiment of the present invention.
Figure 9:
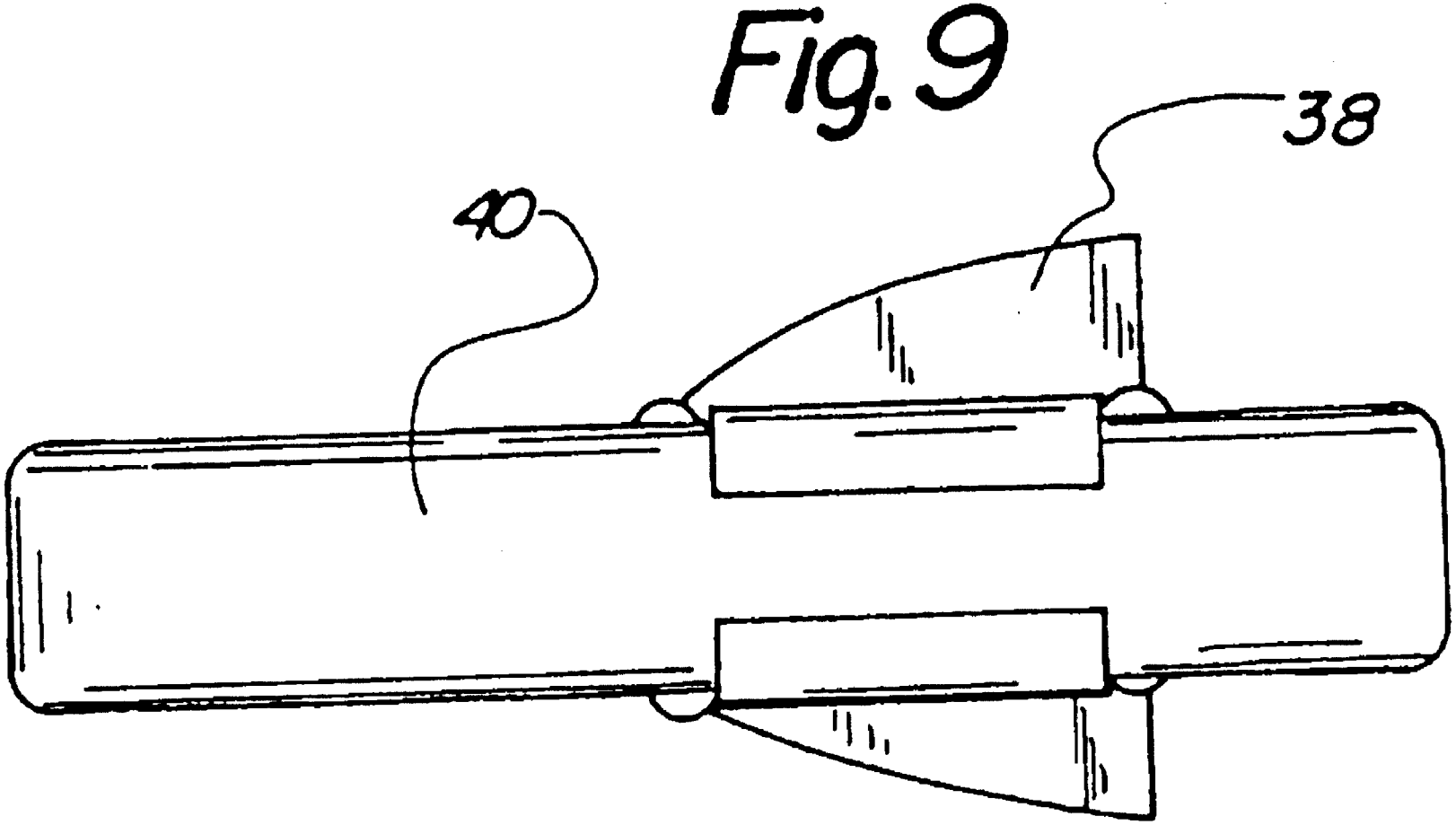
FIG. 9 is a side view of the curtain rod and end cap of the fourth embodiment.

A fourth embodiment of the present invention is shown in FIGS. 8 and 9 and includes substantially all of the components of the present invention and further including wherein two end caps 38 are easily coupled with the inner support section 30. The end caps 38 are coupled with a curtain rod 40. This provides another easy method of hanging curtains.

The present invention is a device which curtains are hung that mounts over the head box of a mini-blind.

It consists of strong extruded plastic in straight pieces of varying lengths, depending on the width of the mini-blinds. Looking at its cross section, there is a square tail section with an open section that fits over a conventional mini-blind's head box. The top of the hanger section extends forward from the top of the tail section and curves down slightly to its vertical face, which falls down to its bottom. The bottom extends back to the front of the tail section at a slight downward slope. A small gap, which forms the continuous curtain glide track, is in the bottom near its front. An inner support piece angles down at about a 30 degree angle from the hanger section's front wall to the tail section's front wall. Two parallel horizontal raised ridges, with equally spaced vertical slots along their length, are located on the hangers face. The slots are for snap-in hooks that hold curtains with rods in pockets.

The hanger is slid over a mini-blind's head box and secured to its rear surface with an adhesive. Curtain slide tabs are slid into the continuous glide track and curtains are hung from the tabs.

The present invention enables a person to add drapes, curtains, or valences to existing mini-blinds without a lot of additional drapery hardwares to mar the window moldings.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A new and improved mini-blind slide-on attachment for upgrading existing mini-blinds already installed in a home to allow drapes and curtains to cover a window comprising, in combination:

a mini-blind having a head box;

a tail section having an inner surface, an outer surface, a front wall, a back wall, and an open lower portion, an adhesive strip coupled with the inner surface of the back wall, the open lower portion receiving the head box of the mini-blind therein, the adhesive strip coupling a side portion of the head box;

an inner support section having a top portion, a bottom portion, and a side portion, the side portion integral with the outer surface of the front wall of the tail section, the inner section serving to receive end caps of curtain rods therein for hanging a curtain therefrom;

a hanger section having a top portion, a front portion, and a bottom portion, the top portion integral with the bottom portion of the inner support, the bottom portion having a receiving slot formed therethrough, the receiving slot serving to receive drape hangers therein;

two parallel raised ridges integral with an outer surface of the front portion of the hanger section, the two parallel raised ridges serving to receive snap-in hooks that hold curtains with rods in pockets.

2. A mini-blind attachment comprising:

a tail section having an open lower portion, the open lower portion having a head box of a mini-blind therein;

an inner support section integral with a front wall of the tail section, the inner section serving to receive end caps of [certain] *curtain* rods therein for hanging a curtain therefrom;

a hanger section integral with a bottom portion of the inner support, the bottom portion having a receiving slot formed therethrough, the receiving slot receiving drape hangers therein, the drape hangers having a securement ball thereon for containment within the receiving slot of the hanger section;

two parallel raised ridges integral with an outer surface of the hanger section, the two parallel raised ridges serving to receive snap-in hooks that hold curtains with rods in pockets; and an adhesive strip coupled with an inner surface of the tail section for securement to the head box of the mini-blind.

3. The attachment as described in claim 2 wherein the two parallel ridges having apertures formed therethrough, the apertures serving to receive the snap-in hooks therein.

4. The attachment as described in claim 2 wherein the inner support section has two end portions, the two end portions having two end caps therein, the end caps coupling with the curtain rod for hanging a curtain therefrom.

*5. An attachment for a mini-blind comprising:*

*a head box;*

*a tail section having a front wall, a back wall, a top outer surface, and an open lower portion adapted to receive said head box, wherein said tail section extends over a substantial portion of said head box;*

*an inner section having a top portion, a bottom portion, and a side portion integral with said front wall of said tail section; and*

*a hanging section integral with said bottom portion of said inner section and having a slot through which drape hangers are received, wherein said inner and hanging sections define an integrated front portion which extends at least the entire length of said head box.*

*6. The attachment according to claim 5 wherein said front portion has two opposing ends, and said attachment further comprises end caps received in said ends.*

* * * * *